US008428906B2

(12) United States Patent
Tosun et al.

(10) Patent No.: US 8,428,906 B2
(45) Date of Patent: Apr. 23, 2013

(54) METHOD AND DEVICE FOR DIAGNOSING A POSITION ENCODER

(75) Inventors: Zeynep Tosun, Stuttgart (DE); Torsten Baumann, Eppingen-Adelshofen (DE); Ralf Buehrle, Hochberg (DE); Gebhard Schumacher, Stuttgart (DE); Carsten Wetzel, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 492 days.

(21) Appl. No.: 12/775,385

(22) Filed: May 6, 2010

(65) Prior Publication Data

US 2010/0286844 A1 Nov. 11, 2010

(30) Foreign Application Priority Data

May 6, 2009 (DE) .......................... 10 2009 002 859

(51) Int. Cl.
*G01B 5/02* (2006.01)
(52) U.S. Cl.
USPC ........................................................ 702/163
(58) Field of Classification Search .................. 702/94, 702/163, 183, 184, 185
See application file for complete search history.

(56) References Cited

U.S. PATENT DOCUMENTS 6,249,068 B1 * 6/2001 Knopp .............................. 310/71
6,970,108 B1 * 11/2005 Cullen ............................. 341/11

* cited by examiner

*Primary Examiner* — Aditya Bhat
(74) *Attorney, Agent, or Firm* — Kenyon & Kenyon LLP

(57) ABSTRACT

A method for determining a mixup in the terminals of a position encoder having a position encoder motor, which is bidirectionally drivable via a plurality of terminals, so that a mixup of at least two of the terminals of the position encoder motor leads to a reversal in the actuation direction of the position encoder, having the following steps of setting an actuating element of the position encoder to a zero setting, from which a motion of the actuating element is possible in one or two directions; driving the position encoder motor according to a diagnostic variable, which is selected so that, based on the actuation using the diagnostic variable, in the case of a non-mixup of the terminals and in the case of a mixup of the terminals, different absolute values of the changes are to be expected in the changes of the actuation position of the actuating element; recording a current change in the actuation position of the actuating element that comes about by the driving of the position encoder motor; establishing a mixup of at least two of the terminals, if the absolute value of the current change of the actuation position of the actuating element deviates from the absolute value of the change in the actuation position that is to be expected.

11 Claims, 2 Drawing Sheets

METHOD AND DEVICE FOR DIAGNOSING A POSITION ENCODER

RELATED APPLICATION INFORMATION

The present application claims priority to and the benefit of German patent application no. 10 2009 002 859.5, which was filed in Germany on May 6, 2009, the disclosure of which is incorporated herein by reference.

FIELD OF THE INVENTION

The present invention relates to motor systems which have a position encoder that is able to be electrically driven by a control unit. The actuation position of the position encoder is able to be recorded, by one or more suitable position encoder sensors, and fed back to the control unit for a plausibility check of the desired actuation position.

BACKGROUND INFORMATION

In engine systems having internal combustion engines, a series of electrically drivable position encoders is used, as a rule, whose actuation positions are recorded by suitable sensors, so that when the respective position encoder is driven, its respective actuation position can be checked. Examples of such position encoders are, for instance, a throttle valve in an air supply system for the respective internal combustion engine, an exhaust gas recirculating valve, a wastegate valve for controlling a turbocharger and the like.

An electrical DC motor (position encoder motor) is used, as a rule, as the drive for the position encoders. As is known for DC motors, the polarity of the electrical variable (supply voltage), by which the DC motor is controlled, is essential for the direction of a change of a position encoder position.

In early development stages in particular, in which electrical connections in the overall system are wholly or partially not developed with the aid of plug contacts that are protected from polarity reversal, the mixup of connecting lines may occur because of wiring harness discrepancies, faulty configurations of the most computer-oriented software or faulty pin positioning, so that the driving of the position encoder is wrongly directed and/or the feedback of the position encoder sensor, situated on the position encoder, is faulty. In the case of a mixup of terminals of the position encoder motor and/or in the case of a mixup of terminals of the position encoder, under certain circumstances, by the simple plausibility check of the position encoder function, the position feedback of the position encoder sensor is misguided when searching for a fault, so that the fault search may become costly.

SUMMARY OF THE INVENTION

It is an object of the exemplary embodiments and/or exemplary methods of the present invention, in the case of a position encoder system having a position encoder driven via a bidirectional position encoder motor, and having a position encoder sensor for feeding back a position encoder position, to provide a method by which polarity reversal of the driving of the position encoder motor, and, furthermore, polarity reversal of the position encoder signals of the position encoder sensor is able to be detected reliably. Furthermore, it is the object of the exemplary embodiments and/or exemplary methods of the present invention to provide a control unit which automatically corrects the detected fault, so that the faultily configured position encoder system may nevertheless be operated.

These objects are attained by the method for determining a mixup of terminals of a position encoder as described herein, and the device according to the alternative description herein.

Further advantageous embodiments of the present invention are delineated and described herein.

According to a first aspect, a method is provided for determining a mixup of the terminals of a position encoder, the position encoder having a position encoder motor which is able to be driven via a plurality of terminals in two directions, so that a mixup of at least two of the terminals of the position encoder motor leads to a reversal of the actuating direction of the position encoder, having the following steps:

setting an actuating element of the position encoder to a zero setting;

driving the position encoder motor according to a diagnostic variable, which is selected so that, based on the actuation using the diagnostic variable, in the case of a non-mixup of the terminals and in the case of a mixup of the terminals, different absolute values of the changes are to be expected in the changes of the actuation position of the actuating element;

recording a current change in the actuation position of the actuating element that comes about by the driving of the position encoder motor;

establishing a mixup of at least two of the terminals, if the absolute value of the current change of the actuation position of the actuating element deviates from the absolute value of the change in the actuation position that is to be expected.

One idea on the above position encoder system, as well as on the method for operating the position encoder system, is to find out whether polarity reversal (mixup of terminals) of the position encoder motor is present, by a suitable driving of the position encoder motor and by monitoring the change in the position encoder position recorded by the position encoder sensor. To do this, starting from a defined zero setting, the position encoder motor is actuated in such a way that, at a correct polarity (no mixup) of the terminals of the position encoder motor, a certain first absolute value of the change of the position encoder position is to be expected, while at a mixup of the terminals a second absolute value of the change is to be expected that is different from the first.

Furthermore, the zero setting between a first end stop of the actuating element and a second end stop of the actuating element may be provided, for which the diagnostic variable is selected so that, when the position encoder motor is driven, the actuating element moves in the direction of the first end stop and is blocked by the first end stop, or moves in the direction of the second end stop without reaching the second end stop, depending on whether the at least two terminals are mixed up.

According to one specific embodiment, a mixup may be established if the driving of the position encoder motor is carried out using the diagnostic variable for moving the actuating element in the direction of the first end stop, and it is blocked there, and an absolute value is ascertained of the change in the actuation position which corresponds to the absolute value of the change of the actuation position in response to the driving of the position encoder motor using a diagnostic variable for moving the actuating element in the direction of the second end stop, particularly without reaching the second end stop.

According to an alternative specific embodiment, a mixup may be established if the driving of the position encoder motor is carried out using the diagnostic variable for moving the actuating element in the direction of the second end stop, particularly without reaching the second end stop, and an absolute value is ascertained of the change in the actuation position which corresponds to the absolute value of the change of the actuation position in response to the actuation of the position encoder motor using a diagnostic variable for moving the actuating element in the direction of the first end stop, and blocking there.

Furthermore, the zero setting may be at a first end stop of the actuating element, the diagnostic variable being selected so that the actuating element does not move in response to a driving of the position encoder motor and is blocked by the first end stop, or moves in the direction of a second end stop, as a function of whether the at least two terminals are mixed up.

Furthermore, it may be provided that, after the establishment of a mixup of the terminals, the at least two terminals of the position encoder motor, the driving of the position encoder motor is corrected automatically, especially by inverting the driving.

The position encoder is able to have a position encoder sensor, and after establishing that no mixup has occurred of the at least two terminals of the position encoder motor, or after correction of the driving of the position encoder motor, the position encoder motor is actuated using an actuating variable, and a mixup of at least two terminals of the position encoder sensor is established if the sign of the change of the actuation position does not correspond to an expected change in the actuation position.

According to one further aspect, a device is provided for establishing a mixup of terminals of a position encoder in a connection between the position encoder and a control unit for driving a position encoder motor of the position encoder. The position encoder motor is drivable bidirectionally via a plurality of terminals, so that a mixup of at least two of the terminals of the position encoder motor leads to a reversal of the direction of the actuating motion of the position encoder; a device being provided for setting an actuating element of the position encoder to a zero setting; the control unit being developed,

- to actuate the position encoder motor according to a diagnostic variable, which is selected so that, based on the driving using the diagnostic variable, in the case of a non-mixup of the terminals and in the case of a mixup of the terminals, different absolute values of the changes are to be expected in the changes of the actuation position of the actuating element; and
- to establish a mixup of at least two of the terminals, if the absolute value of the actuation position of the actuating element, that comes about from the driving of the position encoder motor, deviates from the absolute value of the change in the actuation position that is to be expected.

Furthermore, a drive unit for the position encoder motor may be provided, so that, after the establishment of a mixup of the terminals of the at least two terminals of the position encoder motor by the control unit, the driving of the position encoder motor is corrected automatically, especially by inverting the driving.

The position encoder is able to have a position encoder sensor, the control unit being developed so as, after establishing that no mixup has occurred of the at least two terminals of the position encoder motor, or after correction of the driving of the position encoder motor, to drive the position encoder motor using an actuating variable, and to establish a mixup of at least two terminals of the position encoder sensor if the sign of the change of the actuation position does not correspond to an expected change in the actuation position.

Specific embodiments are explained in greater detail in the following text on the basis of the attached drawings.

DETAILED DESCRIPTION

Figure 1:
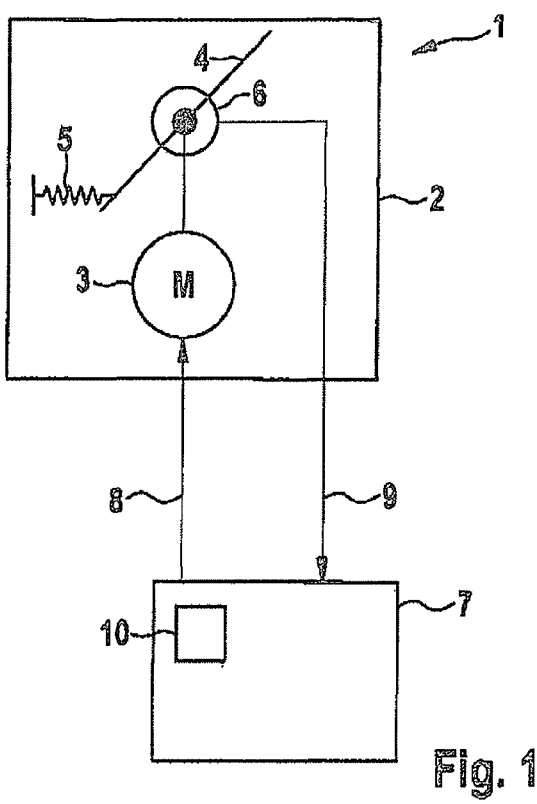
FIG. 1 shows a schematic representation of a position encoder system having a position encoder motor, an actuating element as well as a position encoder sensor.

FIG. 1 shows a position encoder system 1 having a position encoder 2 for use in an internal combustion engine, such as in a motor vehicle. The position encoder may, for example, be equivalent to a throttle valve in an air system, an exhaust gas recirculating flap, a wastegate valve for an exhaust gas turbocharger or to another position encoder that is able to be driven variably. Position encoder 2 is able to be driven electrically and is able to set in a variable manner the position encoder position or setting of one or more actuating elements 4 in accordance with an actuation variable.

Position encoder 2 shown in FIG. 1 includes a position encoder motor 3, which is developed as a DC motor. The DC motor is driven via control lines 8. The DC motor is provided in a suitable manner with an actuating element 4, for instance, an air system flap such as a throttle valve, or an actuating element developed in another way. Actuating element 4 is able to change its actuation position or its setting (angular position) as a function of the driving of the position encoder motor 3. Depending on the driving of position encoder motor 3, for instance, as a function of the polarity of the electric voltage applied, the position of actuating element 4 is able to be changed in the positive or the negative direction. Consequently, when there is a polarity reversal of the supply terminals or of terminals of the drive lines of position encoder motor 3, an actuation motion of actuating element 4 may occur, whose direction does not counteract the desired direction.

Actuating element 4 is coupled to a zero-setting unit 5, which brings actuating element 4 to a predetermined actuation position or setting, upon the discontinuation of the driving of DC motor 3 or upon driving using a drive voltage DV. Zero-setting unit 5 may pace a spring element, for example, which puts actuating element 4 in a zero position. Starting from the zero position, actuating element 4 is able to be adjusted in the positive or negative direction, by the suitable driving of position encoder motor 3. Alternatively, zero-setting unit 5 is able to put actuating element 4 into a stop position, from which actuating element 4 is able to be conveyed only in the direction of an additional end stop.

Actuating element 4 is coupled to a position encoder sensor 6, which provides a suitable electrical signal (e.g. a voltage signal) or an electrical variable (e.g. a resistance value), which gives the actuation position or setting of actuating element 4. Position encoder sensor 6 may, for instance, be an electric resistor (potentiometer) that is variable as a function of the actuation position or setting of actuating element 4, so that when a predetermined current or a predetermined voltage is applied, a measuring voltage or a measuring current is able to be detected correspondingly, that is a function of the position of actuating element 4. The connecting lines for providing the predetermined voltage or the predetermined current and/or the connecting lines for recording the measured voltage or the measured current may be mixed up, and they then lead to a faulty measured value.

Position encoder sensor 6 may also alternatively be developed with the aid of a Wheatstone bridge or the like, in which one or several of the resistors are developed as a function of the actuation position. Upon application of a specified supply voltage to the Wheatstone bridge, a measured voltage may thus be provided that is a function of the actuation position or setting of actuating element 4. In this case, too, the connecting lines for providing the predetermined supply voltage and/or the connecting lines for recording the measured voltage may be mixed up.

Position encoder 2 is controlled with the aid of a control unit 7. Control unit 7 has a drive unit 10, in order, for example, to provide an actuating element 4 according to an external requirement, which is supplied to position encoder motor 3 via drive lines 8. When a DC motor is used, the drive variable may be an electrical drive voltage, whose polarity gives the direction of adjustment of actuating element 4.

Control unit 10 may have an H-bridge circuit, for example, in which either 0V may be set as control voltage or in which all electronic switches of the H-bridge are switched off, so that no driving of position encoder motor 3 takes place (open load). In this case it is to be expected that actuating element 4 takes on zero setting N.

Moreover, control unit 7 is connected to position encoder sensor 6 via several position signal lines 9, in order to receive an actuation position signal. Control unit 7 may be developed to evaluate the actuation position signal and correspondingly to derive an actuation position of actuating element 4. If the position encoder sensor provides an analog signal as the actuation position signal, the actuation position signal may be digitized in control unit 7 using analog/digital conversion, in order thus to make possible a simplified software technology evaluation.

To check whether position encoder motor 3 or position encoder sensor 6 have become of reverse polarity with respect to control unit 7, it is now provided that zero setting unit 5 brings actuating element 4 into an actuation position which is at a different distance from end stops of actuating element 4, or corresponds to an actuation position that corresponds to one of the end stops. This zero setting is taken up if position encoder motor 3 is not driven, or is in general driven so that no actuating force is exerted on actuating element 4. This may be carried out, for example, with the aid of a spring force or another device whereby actuating element 4 is moved to the zero setting.

Figure 2:
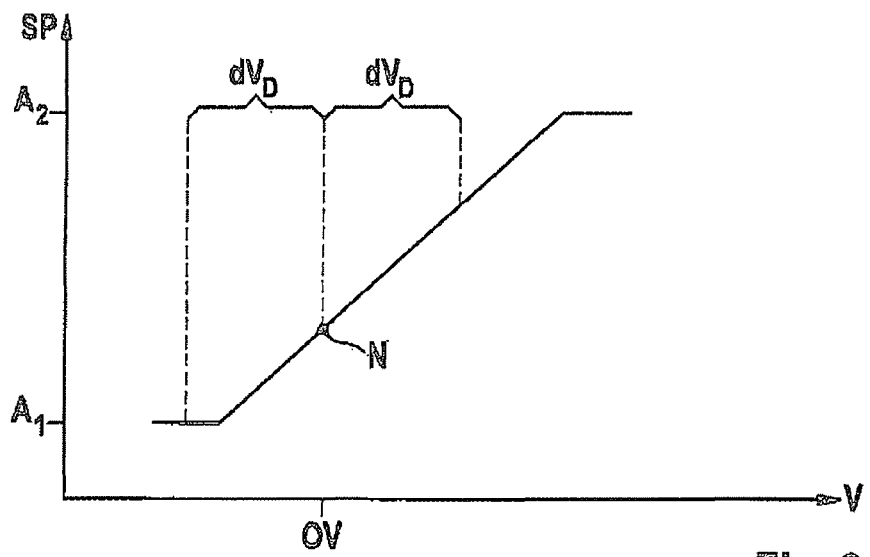
FIG. 2 shows a diagram to show the curve of the position encoder position as a function of an actuating variable for the position encoder motor.

FIG. 2 shows a diagram which gives the position encoder position qualitatively, as a function of the driving of position encoder motor 3. In the diagram of FIG. 2, a drive voltage for position encoder motor 3 is shown on the x axis, and on the y axis, the deflection of the actuating element 4 is shown. The deflection of actuating element 4 may take place, for instance, as a position reading or an angular reading. A first and a second end stop of actuating element 4 are marked as $A_1$ and $A_2$. The zero setting of actuating element 4 is marked by N and it is assumed at a drive voltage of 0V. In the present case, there is a linear curve between the drive voltage and the corresponding position of actuating element 4. However, this curve is only an example, and other, nonlinear curves may be provided. The zero setting is provided so that in the case of an actuation using a positive voltage dV, actuating element 4 is moved in the positive direction, i.e. in the direction of end stop $A_2$.

Figure 3:
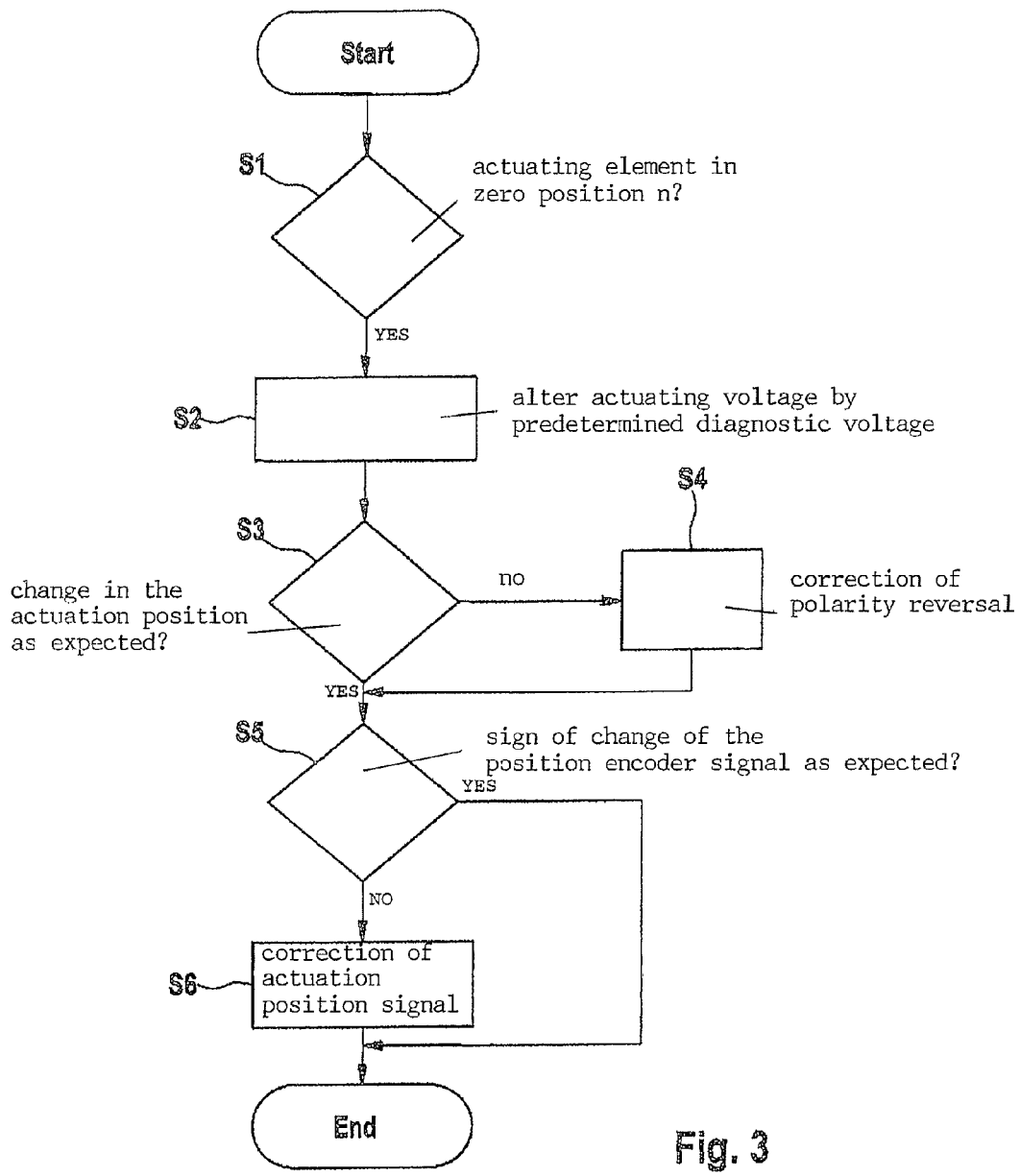
FIG. 3 shows a flow chart for showing the method for the diagnosis of the position encoder system according to FIG. 1.

FIG. 3 shows a flow chart to illustrate the method for diagnosing position encoder 2. In a step S1 it is checked whether actuating element 4 is in a zero position N, or it is ensured zero position N has been reached. This may be done by setting the drive voltage to 0V, or by not driving position encoder motor 3, so that zero position unit 5 brings the actuating element to zero setting N. Alternatively, zero position N may also be approached by a suitable driving of position encoder motor 3, in which zero position N is reliably taken up, regardless of possible reverse polarization.

If zero position N is reached (alternative: yes) the control variable (actuating voltage) is changed for position encoder motor 3 by the predetermined diagnostic voltage $dV_d$, that is, raised or lowered (step S2). The increasing or the lowering of the actuating variable takes place in such a way that, when the polarization of position encoder motor 3 is correct, a change comes about in the position encoder position or the position, in a direction in which, for the selected diagnostic voltage $dV_d$, no reaching of end stop $A_1$, $A_2$ is to be expected. Thus, if in the present exemplary embodiment the actuating voltage is increased by the diagnostic voltage $dV_d$, then, if we assume no reverse polarization of position encoder motor 3, the position encoder position moves in the direction of second end stop $A_2$, without reaching second end stop $A_2$. If there is reverse polarization, actuating element 4 moves in the direction of first end stop $A_1$ and reaches first end stop $A_1$.

In a subsequent step S3, if it is determined by the evaluation of the actuation position signal supplied by position encoder sensor 6 that the actuation position or rather, the setting of actuating element 4 has changed in such a way that it corresponds essentially to the diagnostic voltage or the actuation of the diagnosis, it may thereby be determined that actuating element 4 has moved, starting from zero setting N into a direction of the farther-away end stop (in this case in the direction of second end stop $A_2$). Depending on whether this has corresponded to expectations (alternative: yes) or not (alternative: no), it can be determined whether position encoder motor 3 is connected at reverse polarity or not. If the change in the actuation position corresponds to expectation, that is, of the change in the actuation position which would be effected by the diagnostic voltage $dV_d$ without reaching an end stop, it is determined that there is no reverse polarity of position encoder motor 3.

Since it is not yet known in this step S3 whether there is reverse polarity of position encoder sensor 6, only the absolute value of the change in the actuation position given by the actuation position signal is evaluated, so that the change in the actuation position is able to be evaluated.

If there is polarity reversal in position encoder motor 3 (alternative: no), then according to step S4 a correction of the mixup of the actuating terminals of position encoder motor 3 may be undertaken.

The correction can take place in that the drive of position encoder motor 3 is inverted in control unit 7. For this, the actuating variable (actuating voltage), that is applied at position encoder motor 3, may be inverted before the output to position encoder 2. When an H-bridge driver circuit is used, this may be done in an especially simple way by inverting the control signal applied to the power switch of the H-bridge.

After it has been established that there is no polarity reversal, in step S3 (alternative: yes) or after the correction of the polarity reversal, it is therefore checked in step S5 whether there is reverse polarity of position encoder sensor 6, by analyzing the sign of the change of the position encoder signal at a specified actuating variable. If the actuation position given by the actuation position signal increases in response to the approach to second end stop $A_2$, in accordance with expectation, (alternative: yes), then, in the present exemplary embodiment, in the case of not reaching an end stop, it may be determined that there is no reverse polarity of position encoder sensor 6, by applying a diagnostic voltage and in response to a positive change in the value of the actuation position signal (alternative: yes). If, against expectation, there is a negative change in the actuation position signal of the position encoder sensor, it may be determined that there is reverse polarity of the signal lines of position encoder sensor 6 (alternative: no).

In a similar manner, in step S6, the actuation position signal which, for example, is digitized in control unit 7, may be correspondingly inverted and may be recalculated, according to a model of position encoder sensor 6 in such a way that a change in the actuating variable in one direction yields a desired change in the value of the actuation position signal. At the same time, if a polarity reversal has been established, the statement on the current actuation position may be corrected according to a model of the position encoder sensor. What is essential is that the correction of the actuating variable or the correction of the value of the actuation position signal takes place only if a polarity reversal of position encoder motor 3 was excluded before or a possibly existing polarity reversal was corrected.

Furthermore, it may be determined that, in the case of the driving of position encoder motor 3, starting from zero position N, there is a jamming of actuating element 4 if no change in the position or setting of actuating element 4 can be detected.

In order to ensure that there is no fault in position encoder sensor 6, a corresponding actuation position signal may be checked for plausibility in the zero setting by comparing it to an expected value of the actuation position signal.

A further possibility of detecting a polarity reversal of position encoder sensor 6 may be that two oppositely directed position encoder sensors are used, which each provide an actuation position signal. Depending on whether, in zero setting N, the values, given by the actuation position signals, of the actuation positions of the two position encoder sensors are each located within a predetermined range, that defines the zero setting, or are mixed up, one is also able to establish polarity reversal of position encoder sensor 6.

What is claimed is:

1. A method for determining a mixup of terminals of a position encoder, the method comprising:
    setting, by a setting arrangement, an actuating element of the position encoder to a zero setting, wherein the position encoder has a position encoder motor which is bidirectionally drivable via a plurality of terminals, so that a mixup of at least two of the terminals of the position encoder motor leads to a reversal of the direction of the actuation motion of the position encoder;
    driving, by a control unit, the position encoder motor according to a diagnostic variable, which is selected so that, based on the actuation using the diagnostic variable, in the case of a non-mixup of the terminals and in the case of a mixup of the terminals, different absolute values of the changes are to be expected in the changes of the actuation position of the actuating element;
    recording, by a position encoder sensor, a current change in the actuation position of the actuating element that comes about by the driving of the position encoder motor; and
    establishing, by the control unit, a mixup of at least two of the terminals, if the absolute value of the current change of the actuation position of the actuating element deviates from the absolute value of the change in the actuation position that is to be expected.

2. The method of claim 1, wherein the zero position lies between a first end stop of the actuating element and a second end stop of the actuating element, the diagnostic variable being selected so that, depending on whether the at least two terminals are mixed up, when the position encoder motor is driven, the actuating element moves in the direction of the first end stop and is blocked by the first end stop, or it moves in the direction of the second end stop particularly without reaching the second end stop.

3. The method of claim 2, wherein a mixup is established by the control unit if the driving of the position encoder motor is carried out using the diagnostic variable for moving the actuating element in the direction of the first end stop, and being blocked there, and an absolute value is ascertained of the change in the actuation position which corresponds to the absolute value of the change of the actuation position in response to the driving of the position encoder motor using a diagnostic variable for moving the actuating element in the direction of the second end stop, without reaching the second end stop.

4. The method of claim 2, wherein a mixup is established by the control unit if the driving of the position encoder motor is carried out using the diagnostic variable for moving the actuating element in the direction of the second end stop, without reaching the second end stop, and an absolute value is ascertained of the change in the actuation position which corresponds to the absolute value of the change of the actuation position in response to the driving of the position encoder motor using a diagnostic variable for moving the actuating element in the direction of the first end stop, and being blocked there.

5. The method as recited in claim 1, wherein the zero setting is at a first end stop of the actuating element, the diagnostic variable being selected so that, depending on whether the at least two terminals are mixed up, the actuating element does not move when the position encoder motor is driven, and is blocked by the first end stop, or moves in the direction of a second end stop.

6. The method of claim 1, wherein, after the establishment of a mixup of the terminals of the at least two terminals of the position encoder motor by the control unit, the driving of the position encoder motor is corrected automatically, by inverting the driving.

7. The method of claim 1, wherein the position encoder has the position encoder sensor, and wherein after establishing that no mixup has occurred of the at least two terminals of the position encoder motor, or after a correction of the driving of the position encoder motor, the position encoder motor is driven using an actuating variable, and a mixup of at least two terminals of the position encoder sensor is established if the sign of the change of the actuation position does not correspond to an expected change in the actuation position.

8. A device for establishing a mixup of terminals of a position encoder, comprising:
    a control unit;
    a setting arrangement to set an actuating element of the position encoder to a zero setting, wherein in response to a connection between the position encoder and the control unit for driving a position encoder motor of the position encoder, which is bidirectionally drivable via a plurality of terminals, so that a mixup of at least two of the terminals of the position encoder motor leads to a reversal of the direction of the actuation motion of the position encoder; and a position encoder sensor for recording a current change in the actuation position of the actuating element that comes about by the driving of the position encoder motor;

wherein the control unit is configured for driving the position encoder motor according to a diagnostic variable, which is selected so that, based on the driving using the diagnostic variable, in the case of a non-mixup of the terminals and in the case of a mixup of the terminals, different absolute values of the changes are to be expected in the changes of the actuation position of the actuating element, and wherein the control unit is configured to determine a mixup of at least two of the terminals if the absolute value of the current change of the actuation position of the actuating element deviates from absolute value of the expected change in the actuation position.

9. The device of claim 8, further comprising:

a driving unit for the position encoder motor, wherein after the establishment of a mixup of the terminals of the at least two terminals of the position encoder motor by the control unit, the driving of the position encoder motor is corrected automatically, by inverting the driving.

10. The device of claim 9, wherein the position encoder has the position encoder sensor, and wherein the control unit is configured so as, after establishing that no mixup has occurred of the at least two terminals of the position encoder motor, or after a correction of the driving of the position encoder motor, to drive the position encoder motor using an actuation variable, and to establish a mixup of at least two terminals of the position encoder sensor if the sign of the change of the actuation position does not correspond to an expected change in the actuation position.

11. The device of claim 8, wherein the position encoder has the position encoder sensor, and wherein the control unit is configured so as, after establishing that no mixup has occurred of the at least two terminals of the position encoder motor, or after a correction of the driving of the position encoder motor, to drive the position encoder motor using an actuation variable, and to establish a mixup of at least two terminals of the position encoder sensor if the sign of the change of the actuation position does not correspond to an expected change in the actuation position.

* * * * *